Aug. 10, 1965
C. O. PETTY ETAL
3,200,171
NEUTRAL ESTER STABILIZATION
Filed March 13, 1962
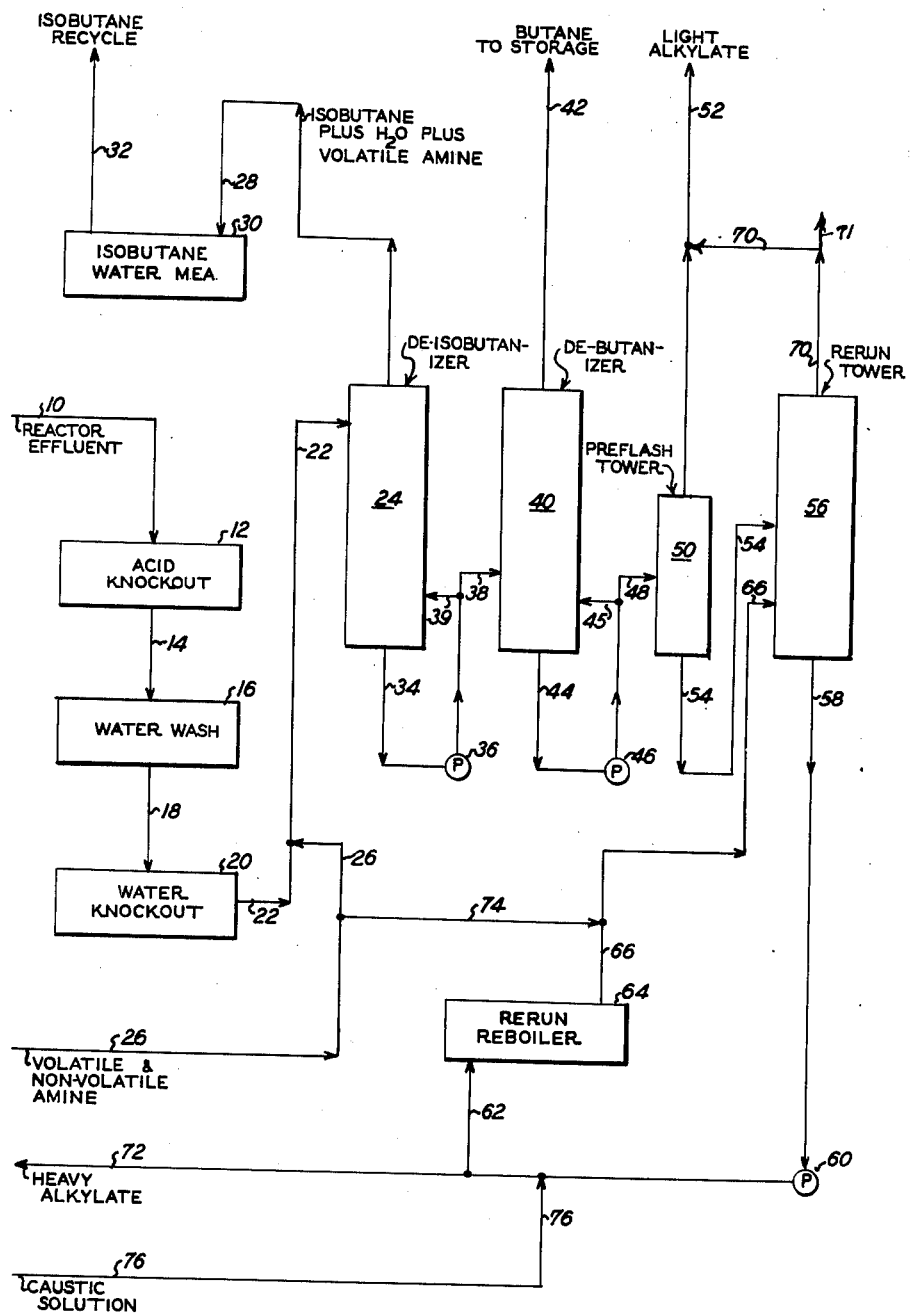
INVENTORS
Charles O. Petty
Robert S. Kung
BY Sul B. Wick
ATTORNEY

United States Patent Office 3,200,171
Patented Aug. 10, 1965

3,200,171
NEUTRAL ESTER STABILIZATION
Charles O. Petty and Robert S. Kung, Tyler, Tex., assignors to La Gloria Oil and Gas Company, Houston, Tex., a corporation of Delaware
Filed Mar. 13, 1962, Ser. No. 179,435
4 Claims. (Cl. 260—683.62)

The present invention relates to stabilizing the performance number of olefine alkylate and, more particularly, stabilization thereof to inhibit hydrolysis of neutral ester therein during its distillation. The invention further includes treatment of an olefine alkylate purification system to protect it against corrosion and fouling by neutralizing acidic products of neutral ester hydrolysis by distillation with volatile and non-volatile alkaline materials.

In the formation of olefine alkylate, light $C_3$–$C_5$ olefine and non-olefine gaseous components are contacted with sulfuric acid or similar corrosive acid catalyst or mixtures thereof whereby olefine in the feed, in addition to being alkylated to light distillate, forms sulfuric acid esters of some of the olefine components. Free sulfuric acid and mono-esters such as butyl sulfate, having a free acid group, are readily removed by washing of the distillate with aqueous caustic. Di-esters of sulfuric acid such as dibutyl sulfate, however, are neutral and such small quantities as may be formed in the olefine alkylation are not removed by caustic wash from the alkylate.

The crude alkylate formed from $C_3$–$C_5$ pure or mixed hydrocarbon streams includes substantial quantities of monomer olefines and alkanes such as butane, isobutane, butylene, isobutylene, and homologous gases, low olefine polymers and alkylation products thereof, thus ranging from a light spirit IBP of about 100° F., seasonally adjusted, to an end point of the order of 200 to 300° F., more or less, fractionating to any desired end point. The purification of such product usually includes washing with aqueous caustic, degasifying to remove butanes and isobutanes and then fractionally distilling the alkylated olefine naphthas to separate it from neutral ester bottoms.

The neutral esters formed tend to be heavier and would normally remain as high distillation temperature bottoms except that in the presence of moisture available from caustic washing and the high temperature, the neutral esters tend to be hydrolyzed to both free acid and corresponding monoalkyl sulfates, the latter being readily volatile and the acid, itself, may be volatilized at higher temperatures near the end point. The presence of even traces of acid tend, moreover, to accelerate the hydrolysis. Finally, high temperatures promote decomposition and some evolution of $SO_2$ gases. A consequence is that during the separation of monomeric hydrocarbon, such as debutanizing or de-isobutanizing, volatile acid esters tend to corrode ducts and condensing equipment; and heavier non-volatile and acid esters tend both to foul and to corrode by further polymerization and, by direct acid attack, corrosion of the distillation equipment.

Overhead olefine alkylate distillate which carries the acid sulfuric ester has its performance number directly reduced, often equivalent to about 1 cc. of leadtetraethyl, which must be compensated for by addition of expensive aromatics, usually toluene, to meet normal high performance specifications.

It is, accordingly, a primary object to inhibit hydrolysis; that is, to stabilize the neutral esters in the system, reducing the formation of acid components during distillation.

It is a further object to inhibit corrosion of overhead units of apparatus by the volatile portion of the distillate by inclusion of volatile alkaline substance as well as to inhibit corrosion of the equipment by distillation residue by inclusion of non-volatile alkaline substance.

I have found that an outstanding inhibitor for the decomposition of neutral esters contained in olefine alkylate at high temperatures is a high molecular weight sterically hindered amine. By sterically hindered amine, as the term is used herein, is meant an amine in which at least one of the organic groups attached to the amino nitrogen is a tertiary alkyl carbon atom, the total organic hydrocarbon groups having from about 12 to 22 carbon atoms, which may be a total of 22 carbon atoms contained in a primary, secondary or tertiary amine, preferably a primary or secondary amine, whereby the amine is soluble in the olefine alkylate but is relatively non-volatile, preferably non-volatile under a 20 inch gage vacuum at 325° F., and is thermally stable to 350° F.

Typically useful sterically hindered amines for this purpose are N-1,1,8,8-tetramethylnonylamine, N-tertiarybutyl-N-1,1,8,8-tetramethylnonylamine and N-1-tetrahydrofuryl,N-1,1,8,8-tetramethylnonylamine. Such amines may be usefully formed by first forming an imino (Schiff's base) derivative of an aldehyde or ketone with ammonia or such hindered amine, and then reducing the nitrogen imino double bond by hydrogenating. That type of production forms a secondary amino compound. That manner of production is one of the reasons why the primary and secondary high molecular weight sterically hindered amines are preferred.

In the purification of the crude olefine alkylate, it is first usually washed with aqueous caustic, and is then de-isobutanized and/or de-butanized for removal of such low molecular weight hydrocarbon values, and the olefine alkylate is then distilled, often stepwise, first to flash the more volatile naphthas and then to distill heavier naphtha at higher temperatures, the treatments with alkaline substances being separated for optimum alkaline protection of apparatus at the several points.

In the first treatment to recover butane and isobutane the caustic washed olefine alkylate has added thereto a volatile amino compound which will volatilize with the butane and isobutane for the purpose of protecting overhead condensing apparatus from corrosive components carried over with such gases. The corrosive effect usually results from the combined presence of acid, acid sulfonate and water vapors carried overhead with the gases and, consequently, my volatile amine component is preferably selected not only to pass overhead with such gases but is one which has substantial solubility in the water. For this purpose the volatile amine may be methylamine, ethyl amine, propylamine, monoethanol amine (MEA) and other similar amine components that tend to volatilize in the presence of water vapor at relatively low temperature.

Simultaneously, my relatively non-volatile stabilizer for the neutral esters is passed into the system. The volatile neutralizing amine is usually added in quantity sufficient to render the overhead butane-isobutane condensate alkaline about .0005 to 0.1%, preferably about .001 to .01% by weight of the total alkylation product entering the system.

In our system we use a combination of a volatile amine, as stated, usually added in a range of about 10 to 20 gallons per day, preferably about 11 to 14 gallons per day per one thousand barrels of raw olefine alkylate entering the system, together with about 4 to 15 gallons per day, about 12 to 30 pounds per one thousand barrels of the hindered amine stabilizer. The hindered amine stabilizer may be added in separate portions in the range of about .0001 to .05% by weight to the alkylated olefine passing through distinct stages. For instance, the first portion can be added as it enters the de-isobutanizer and a further portion can be added following the rerun-reboiler as it enters the rerun tower for further insurance that the heavy stabilizer is adequately distributed throughout the system.

The bottom sections of the system are protected by addition of a non-volatile alkaline substance that remains with the bottoms during reboiling and refractionating in the rerun tower. Such non-volatile substance is usually a 5 to 10% aqueous caustic solution which may be of the alkaline metals such as sodium, potassium or lithium. Relatively non-volatile amine bodies such as triethanol amine can also be used as the non-volatile alkaline component.

The invention is further explained in reference to the drawing wherein the single figure illustrates diagrammatically a typical flow sheet for purification of the olefine alkylate.

Crude olefine alkylate enters the system through line 10 and is washed with aqueous caustic in the acid knock-out tank 12, the product passing by way of line 14 to a water wash tank 16, where it is washed free of caustic. It passes thence by line 18 to a water knock-out tank 20, passing by line 22 to de-isobutanizer tank 24. Volatile amine such as monoethanol amine and sterically hindered stabilizer amine for non-volatile neutral ester such as 1,1,8,8-tetramethyl nonylamine, each in small quantity, as stated above, are passed by way of line 26 into line 22. The olefine alkylate in de-isobutanizer 24 is stripped of isobutane and some water vapor, heating being supplied (not shown) at a low temperature with close temperature control. The iso-butane vapors, some water vapor and the volatile monoethanol amine pass overhead through line 28, the condensed isobutane and water bottoms collecting in receiver 30 from which isobutane is withdrawn as needed through line 32 for re-cycle.

The stripped olefine alkylate is withdrawn from stripper 24 through line 34 and is passed by pump 36 through line 38 into a de-butanizer 40. The temperature in still 24 can be controlled by heating coils in the bottom of the tank (not shown), or the heating may be applied to the fluid passing through line 34 by way of a re-boiler (not shown), and returned to the stripper 24 through line 39. In a similar manner olefine alkylate in stripper 40 has the butanes stripped, its vapors passing overhead through line 42, the vapors including some moisture and corrosion-inhibiting monoethanol amine as in the de-isobutanizing system, which are condensed and stored (not shown). The stripped olefine alkylate is withdrawn as bottoms through line 44 and pumped by pump 46 through line 48 into a pre-flash tower 50. As in tank 24, tanks 40 and 50 may be heated to proper temperature by coils in the bottom thereof (not shown) or heated by a re-boiler in line 44 (not shown) for re-cycle through line 45, or for pre-flash in tower 50.

Light olefine alkylate passes overhead through line 52 together with some protective volatile corrosion-inhibiting monoethanol amine, and the heavier olefine alkylate bottoms are withdrawn through line 54 and sent to a re-run tower 56 for final distillation. In the re-run tower, bottoms are withdrawn through line 58 and sent by pump 60 and line 62 to a re-run re-boiler 64 in which volatile portions of the heavier alkylate are heated to vaporization, the hot vaporous mixture returning by line 66 to the re-run tower 56, re-boiler 64 providing sufficient heat to vaporize intermediate and light alkylate which passes overhead through line 70.

The distilled heavy olefine alkylate vapors may be condensed separately through line 71 or combined with light alkylate through line 70, as desired. Heavy non-volatile olefine alkylate bottoms accumulating in the system may be wthdrawn through line 72. In order to be certain that the relatively non-volatile amine remains with the neutral ester-containing portion, some of the remainder of non-volatile and volatile amine passes through line 74 from line 26 into line 66, entering the re-run tower as a protective mixture of relatively non-volatile and volatile amine.

The re-run re-boiler 64 is subject to highest distillation temperatures wherein the tendency to hydrolysis of heavy neutral ester contained in olefine alkylate bottoms is at a maximum. It is specially protected by addition of non-volatile caustic entering through line 76, passing thence into line 60, and entering the re-boiler through line 62, so that large quantities of non-volatile caustic are continuously present in the re-boiler for protecting it against fouling and corrosion. Caustic will be entrained and carried with re-boiler fluids passing through line 66 into the re-run tower 56 and the bottoms thereof, withdrawn through line 58, carries the caustic with it, thus providing circulation of caustic in the high temperature system from re-run re-boiler 64 into re-run tower 56 as a protective film of caustic, the caustic ultimately being withdrawn from the system with heavy alkylate residues through line 72.

The following example illustrates the practice of this invention:

EXAMPLE I (a) In the normal operation of the system described without protective components, crude olefine alkylate is first caustic washed and the stripped butane and isobutane from the wet reaction product results in great corrosion in the isobutane and butane condensers, due to volatile acids carried overhead with the stripped gases. Very substantial corrosion, moreover, takes place further in both the re-run tower and the re-boiler, the latter followed rapidly by deposition of heavy tars, resins and carbon.

(b) In operation of this system, according to this example, 12 gallons per thousand barrels per day of monoethanol amine is added to the olefine alkylate entering the system, and some corrosion in the de-isobutanizer and condensers is reduced, but the olefine alkylate has a performance number of about 140, requiring 6% of toluene to offset a reduction in performance number about 6 units, equivalent to about 1 cc. of lead tetra ethyl. Inasmuch as av-gas specifications require that much aromatics, the toluene could not be replaced with less expensive, but less effective, platformate as a source of aromatics. The system, thus described, was further treated with 4 gallons per thousand barrels per day of 1,1,8,8-tetramethyl-nonylamine, sterically hindered amine, and the performance number averaging was sufficiently stabilized so that the toluene could be replaced entirely by less expensive platformate as shown in Table I.

(c) Even operating as described, there was a tendency to heavy corrosion and fouling in both the re-run tower and re-run re-boiler. To overcome this, a 10% solution of aqueous sodium hydroxide was circulated in the system continuously as illustrated in the drawing, and it was found with the combined treatments, the addition of volatile amine, addition of the neutral ester stabilizer, sterically hindered amine, and the circulation of non-volatile caustic, stabilized the quality of the olefine alkylate and prevented corrosion and fouling in both the volatile and the non-volatile product portions of the system.

The following table illustrates the value of treatment of olefine alkylate with hindered amine, the particular hindered amine used in the table consisting of N-1-tetrahydrofuryl,N-1,1,8,8-tetramethylnonylamine, the stabilizer being added in quantity of 4 gallons per 1,000 barrels of olefine alkylate. The table shows the amount of toluene and platformate respectively required to produce a specified 145 performance number before and after the chemical addition.

Table I

| Date | Performance Number | Vol. Percent Platformate | Vol. Percent Toluene |
|---|---|---|---|
| Before Chemical: | | | |
| 2-2 | 145.5 | 6.0 | 5.0 |
| 2-6 | 145.1 | 5.0 | 5.0 |
| 2-9 | 145.6 | 0.0 | 7.0 |
| 2-13 | 145.5 | 0.0 | 6.5 |
| 2-16 | 146.1 | 0.0 | 6.5 |
| 2-20 | 146.1 | 2.0 | 6.0 |
| 2-21 | 145.6 | 3.0 | 5.0 |
| 2-26 | 146.1 | 2.0 | 6.0 |
| 2-27 | 145.1 | 2.0 | 6.0 |
| 3-1 | 145.5 | 0.0 | 7.0 |
| 3-7 | 145.6 | 3.0 | 4.0 |
| 3-10 | 146.1 | 2.5 | 5.5 |
| 3-17 | 146.1 | 0.0 | 7.0 |
| Averages | 145.7 | 2.0 | 5.9 |
| After Chemical (3-16—5 gal./day until 4-4): | | | |
| 4-19 | 145.0 | 4.0 | 3.0 |
| 4-21 | 146.1 | 4.0 | 3.0 |
| 4-25 | 144.8 | 4.0 | 3.0 |
| 4-27 | 144.6 | 4.0 | 3.0 |
| 5-1 | 146.5 | 5.0 | 3.0 |
| 5-8 | 146.5 | 8.0 | 3.0 |
| 5-10 | 146.0 | 9.0 | 2.0 |
| 5-15 | 145.6 | 9.5 | 2.0 |
| 5-17 | 145.4 | 8.5 | 3.0 |
| 5-22 | 145.6 | 6.0 | 3.0 |
| 2-25 | 146.6 | 6.0 | 3.0 |
| 5-31 | 146.6 | 6.0 | 3.0 |
| Averages | 145.7 | 6.2 | 2.8 |

As thus described, olefine alkylate has its neutral esters stabilized against decomposition by addition of a small quantity of a sterically hindered amine, at least one of the organic groups attached to the nitrogen being a tertiary aliphatic hydrocarbon, the total amine having from 12 to 22 carbon atoms and boiling at about 350° F. at 20 inch gage. The olefine alkylate purification system is further protected by a volatile amine, and by a relatively non-volatile alkaline agent, preferably a caustic alkali solution in water.

We claim:

1. Process of stabilizing olefine alkylate against decomposition of neutral esters therein, comprising adding to the olefine alkylate a small quantity of a non-volatile amine, at least one of the organic groups attached to the amino nitrogen being a tertiary alkyl group, said amine having from 12 to 22 carbon atoms and being thermally stable and having a normal boiling point above 350° F.

2. Process of stabilizing olefine alkylate against decomposition of neutral esters therein, comprising adding to the olefine alkylate a small quantity of a non-volatile amine selected from the group consisting of N-1,1,8,8-tetramethylnonylamine, N-tertiarybutyl-N-1,1,8,8-tetramethylnonylamine and N-1-tetrahydrofuryl,N-1,1,8,8-tetramethylnonylamine.

3. The method of stabilizing olefine alkylate containing traces of neutral ester comprising adding a small quantity of a hindered amine thereto, said hindered amine having at least one of its organic radicals attached to the nitrogen through a tertiary carbon atom and having from 12 to 22 carbon atoms, said amine being thermally stable and having a boiling point exceeding about 350° F.

4. The method as defined in claim 3 wherein said olefine alkylate is stabilized by adding small quantities of both a volatile amine and a non-volatile hindered amine thereto, said hindered amine having at least one of its organic radicals attached to the nitrogen through a tertiary alkyl and having from 12 to 22 carbon atoms, said hindered amine being thermally stable and having a boiling point exceeding about 350° F.

References Cited by the Examiner

UNITED STATES PATENTS

| 2,736,658 | 2/56 | Pfohl et al. | 260—563 X |
| 2,850,461 | 9/58 | Bloch et al. | 252—390 X |
| 3,038,017 | 6/62 | Ayers et al. | 260—683.62 |

OTHER REFERENCES

T-alkyl primary amines, SP–33, July 1961, Rohm & Haas Co., Special Products Dept., Philadelphia, pages 3 and 11.

DELBERT E. GANTZ, *Primary Examiner.*

ALPHONSO D. SULLIVAN, *Examiner.*